UNITED STATES PATENT OFFICE.

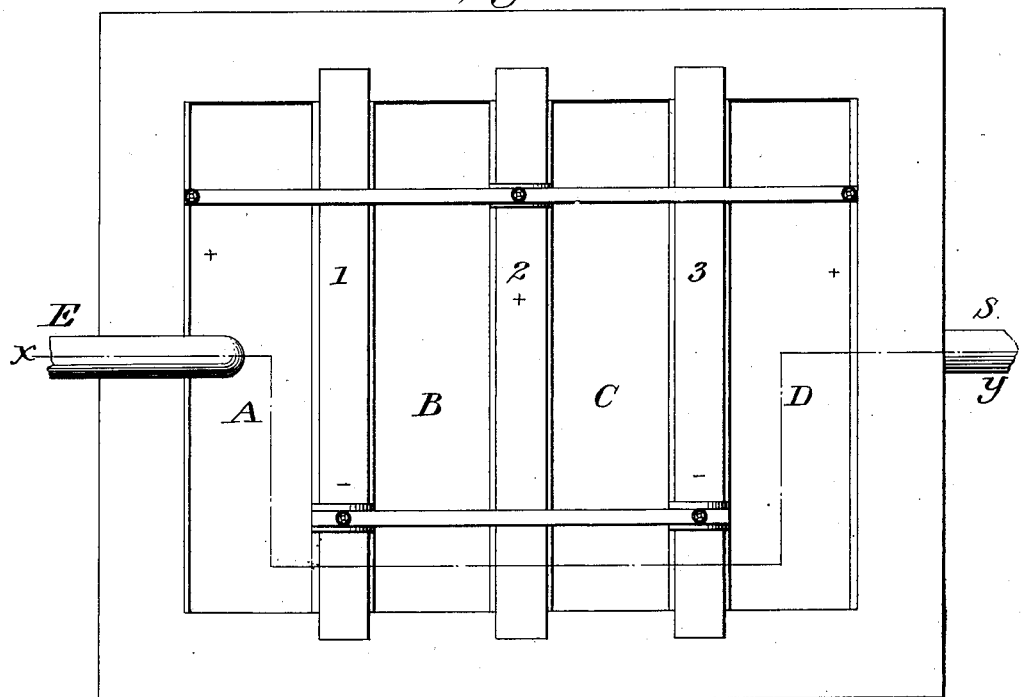
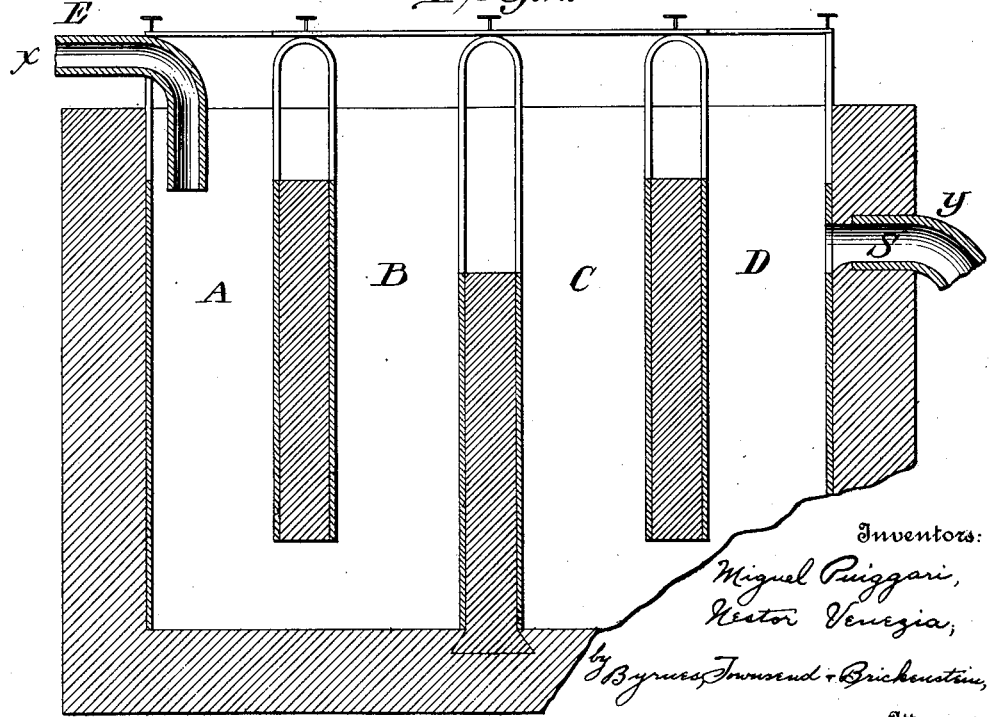

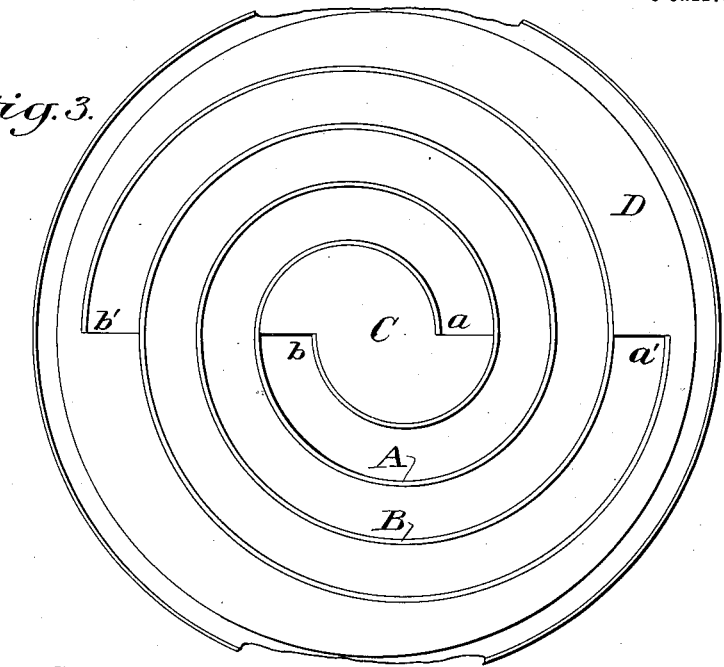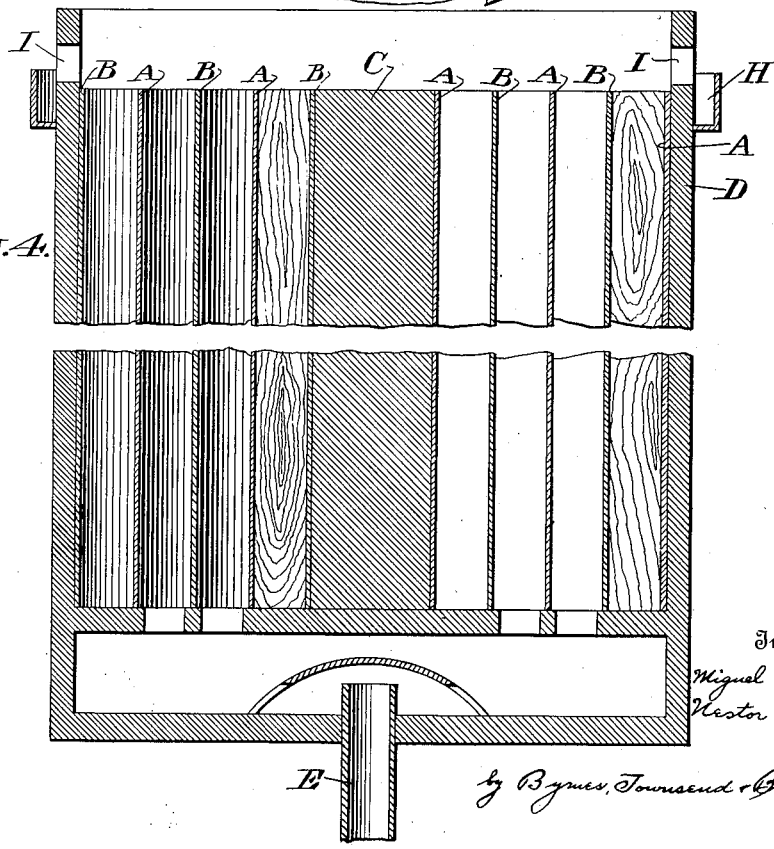

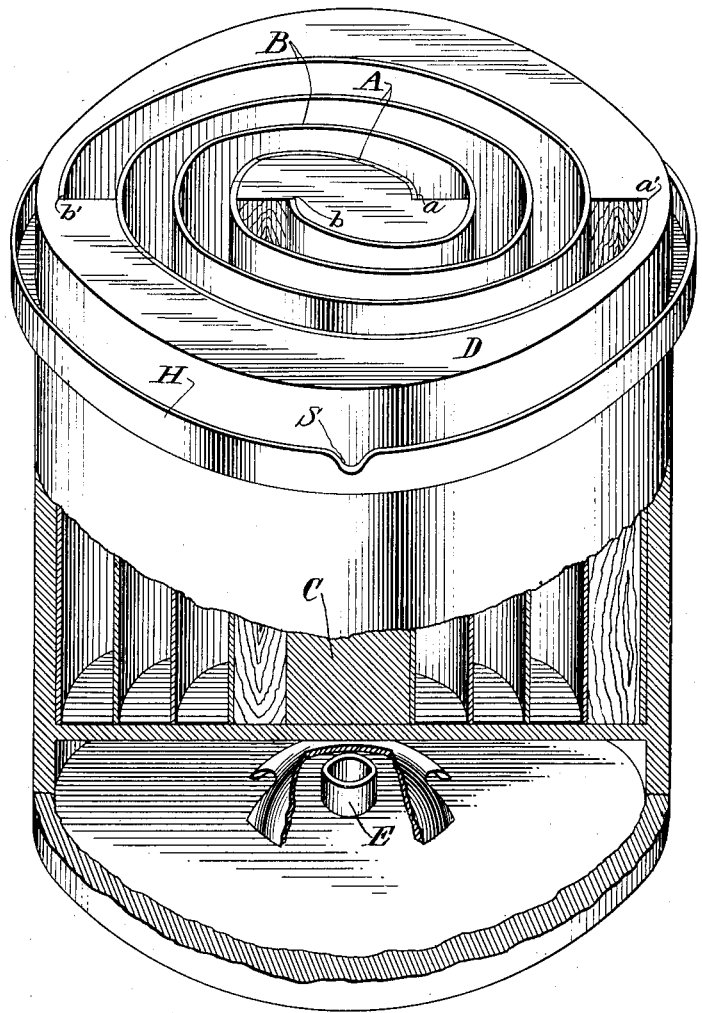

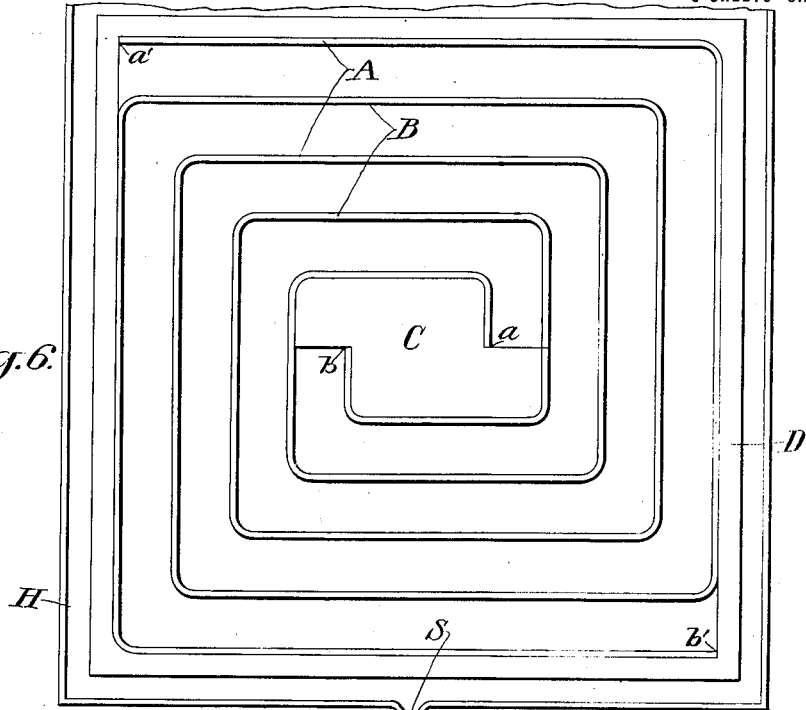
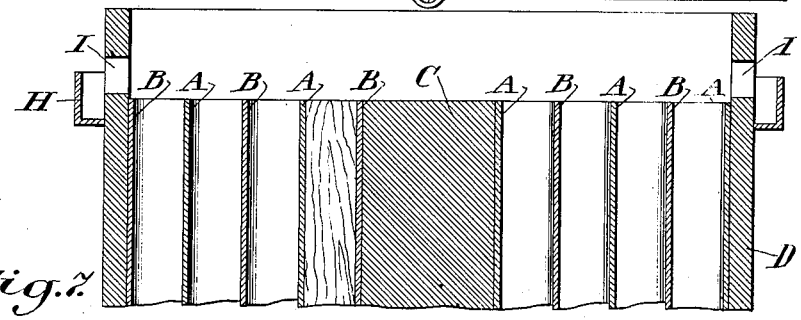
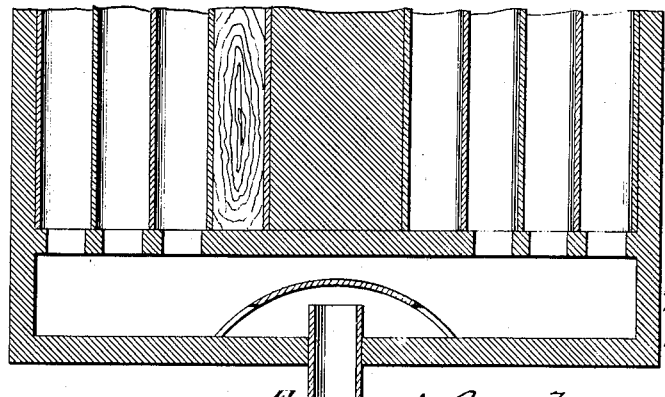

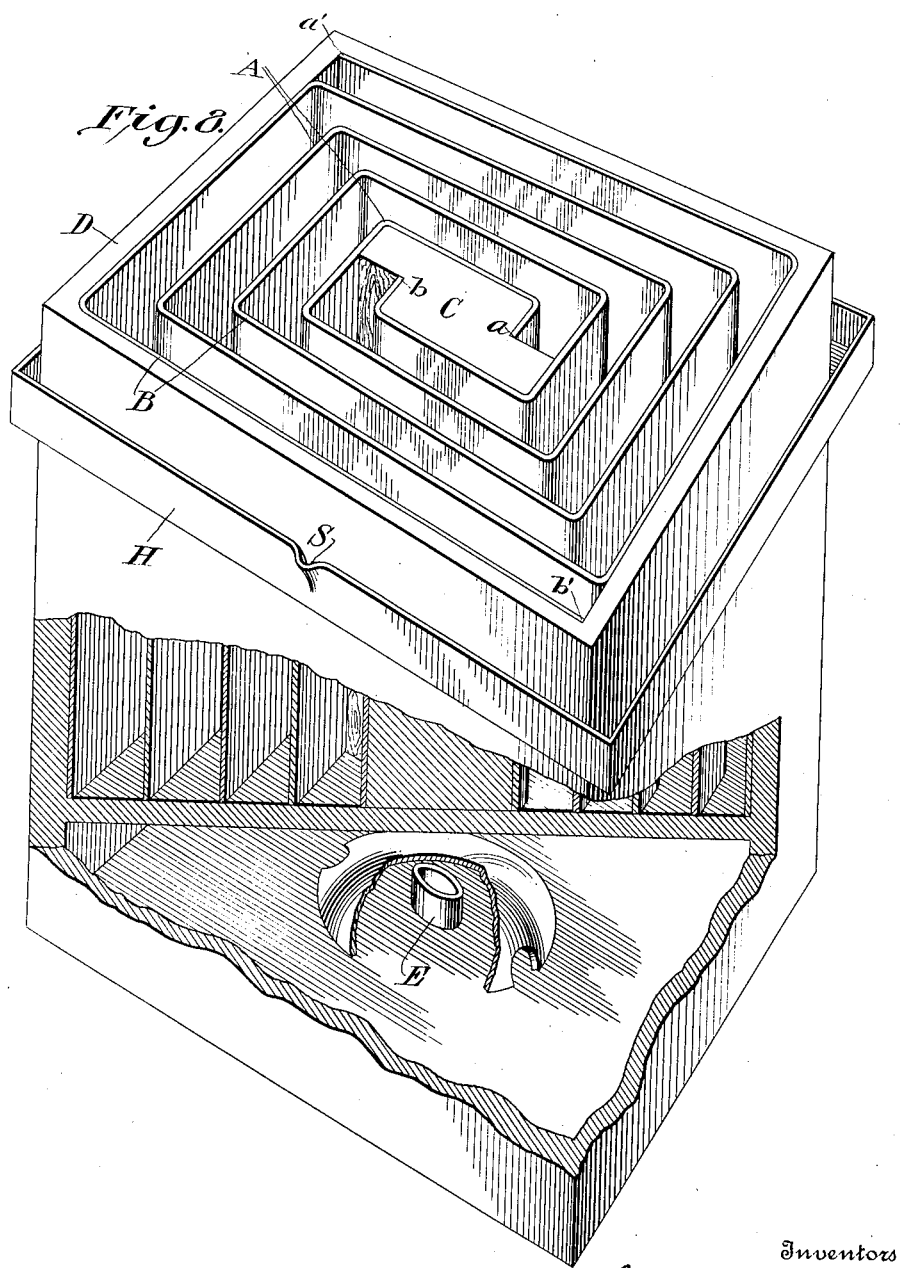

MIGUEL PUIGGARI AND NESTOR VENEZIA, OF BUENOS AIRES, ARGENTINA.

PROCESS FOR THE PURIFYING AND CLARIFYING OF WATER.

1,392,524. Specification of Letters Patent. Patented Oct. 4, 1921.

Application filed November 24, 1917. Serial No. 203,841.

*To all whom it may concern:*

Be it known that we, MIGUEL PUIGGARI, a citizen of the Argentine Republic, and NESTOR VENEZIA, a subject of the King of Italy, residing at No. 130 Acoyte street, Buenos Aires, Argentina, have invented certain new and useful Improvements in a Process for the Purifying and Clarifying of Water, of which the following is a specification.

This invention relates to an improved process for the clarification and purification of the water of rivers, lakes and of the subsoil, for rendering the same drinkable, being also extensive to the purification of waters destined to industrial uses and of residual or waste waters. This invention substantially has for object a process for clarifying and purifying said waters which consists in submitting the same to the action of an electric current of high tension, so as to provoke cataphoresis.

The invention also has for object a suitable apparatus for carrying into practice the process in accordance therewith.

Heretofore, no method or process has been known for clarifying and purifying water to be used for drinking, in which an electric current shall have been employed to act directly on the matters held in suspension or dissolved in the water and which form the impurities of the same, without aggregation of any material, either directly or indirectly.

Natural water, whichever be its origin, in order to be drinkable, requires a previous treatment, either for the purpose of modifying its organoleptic properties, its chemical composition or its biological qualities.

The process for artificially correcting the properties of water, known up to this date, are based, as regards the modification of its organoleptic properties and its chemical composition, on the sedimentation, on the precipitation and correction of the chemical composition of the water and for that purpose, aeration, ebullition, distillation and freezing have chiefly been recurred to, as well as the employment of corrective matters or agents of chemical action.

For the purpose of correcting the biological properties of water, mechanical, physical and chemical means are employed.

As a mechanic means, filtration is recurred to under its multiple forms, such as natural filtration by the soil, or artificial filtration, either on a large or reduced scale by using filters of quick or slow action, or filters assisted in their operation by chemical agents, such as sulfate of aluminium, actually used for that purpose in Buenos Aires.

For the physical biological correction of water, heat, electricity and ultra-violet rays are used.

For the purpose of chemical biological correction, among other agents or matters, bromin, chlorin, sulfate of copper, peroxids, salts of iron, magnesium, calcium, sodium and ozone are used.

Electricity, as before stated, has been recurred to for the biological correction of the water destined to be used for industrial purposes or for the partial sterilization of water; in this process, the chemical reaction provoked with organic matters, utilizes the oxygen generated within the body of water by electrolysis; this electrolysis causes simultaneously, at low tension or reduced voltage, the decomposition of the salts dissolved in the water. Waters containing chlorid of sodium, for instance, when submitted to an electric current, will decompose. Chlorin will be set free at the anode formed of carbon sheets, while potassium will be found at the cathode, formed of iron sheets; potassium, in the presence of water, causes the formation of hydroxid, with liberation of hydrogen; the hydroxid, in the presence of nascent chlorin, forms hypochlorites, chlorates and perchlorates.

Natural or universal waters and the waters commonly called bitter or salt waters (owing to the large amount of salts which they hold in solution), when submitted to the action of an electric current, suffer, as consequence of the electrolysis, a transformation which takes place more or less speedily, according to the amount of salts contained therein. For the purpose of activating this electrolytic process for the purification of water, the addition of alkaline or earthy alkaline chlorids is recurred to. (Hermite's process, among others.)

In other cases, the electric current is employed directly without the aggregation of any matter whatever, this way being adopted by the Stanley Electric Company of Philadelphia; in this instance, however, carbon electrodes are used at the negative pole, and iron electrodes at the positive pole. On applying the electric current, oxygen is generated at the positive pole; part of this oxygen combines with the organic matter and another part corrodes the iron and oxidizes the same, and the hydroxid of iron which slowly forms, becomes free and acts as the oxid of iron formed in the purifiers of Anderson, known since 1857. In consequence, the electric current has for object to activate the oxidation of the iron of the electrode, thereby accelerating the purifying operation, in comparison with other known processes. It will be noted that though no foreign matter is added directly in this process, it is done indirectly, by employing the material of the electrode of iron.

It follows that the use of electricity for purifying water only has been adopted in the processes which modify the composition of the same and thus intimately alter its qualities, rendering such waters improper for drinking, in particular when they are mineralized.

The processes in which salts are added for obtaining the electrolysis, or that adopted by the Stanley Electric Company who make no such addition, substantially operate by mere chemical reactions, provoked by the action of the electric current on the water itself, on its salts and on the metals which form the electrodes. These methods have been proposed for the treatment of industrial and residual waters or for waters to be partially sterilized, before their discharge into the rivers.

The process in accordance with our invention, does not substantially modify the chemical composition of the water as regards its contents of salts or of gases. On the other hand, it remarkably decreases the amount of organic matters held in suspension therein, rendering the water perfectly crystalline, transparent and drinkable.

This process substantially consists in causing an electric current of high tension, up to 2000 volts, to pass through the water, kept in continuous motion, in such a way that the water will only remain during a short time in contact with the metallic electrodes, of large surface; in this manner, the phenomenon of electric cataphoresis, that is to say, the positive colloid granules migrate toward the cathode, while the negative colloids travel through the current toward the anode, and during such travel of the colloids in suspension (clay, humus, etc.), the formation of compound coagulated colloids is caused which, on accumulating at the electrodes, are completely precipitated.

During the passage of the water through the electric field a large part of the dissolved organic matters is intercepted, coagulated and precipitated as described.

This process of clarification and purification is entirely due to the phenomenon of cataphoresis.

The clarifying and purifying action of the process, in accordance with this invention, is not based on the liberation of oxygen, nor has the same as main principle, the formation of salts. On the contrary, this process is based on the electric phenomena of cataphoresis, avoiding as means for clarifying and purifying the electrolysis, for which purpose electric currents of high voltage are used.

The water, short moments after being submitted to this treatment, will be found to not be electrolyzed at all—a fact which may be readily ascertained by chemical reactions (decomposition of the oxygenated water) and physical reactions (resistibility of the water before and after treatment).

The sediment which immediately forms by rest, is easily separated by decantation and resembles that which is obtained by treatment with sulfate of aluminium, in its manner of precipitating as well as in its flaky appearance. The invention may be carried into practice by employing several devices or apparatus, three of which have been shown in the accompanying drawings, by way of example, as any other suitable device, adapted to perform the same objects, might also be used.

In the said drawings:

Figure 1 is a plan view of one form of a device embodying the invention;

Fig. 2 is a vertical section therethrough;

Figs. 3 and 4 are a plan view and a central vertical section respectively of a modified form of the invention;

Fig. 5 is a perspective view, partly in section of the same;

Figs. 6 and 7 are a plan view and a central vertical section respectively of another modification; and Fig. 8 is a perspective view partly in section, of the same.

In accordance with this form of construction, the electric purifier (as we shall hereinafter call the apparatus), consists of a container of stone, wood or any other convenient material, coated with a layer of suitable insulating varnishes or paint. Said container is divided into four compartments A, B, C and D, by means of the vertical divisions or diaphragms 1, 2, 3, arranged so that the compartments will alternately communicate with each other, that is to say, one by its lower part or bottom, and the other by the top.

The vertical walls of the compartments, parallel to the diaphragms, are covered with metallic electrodes, electric contacts being established alternately with the two poles by means of suitable connections, in the manner shown in the drawings.

The water enters into the apparatus by the pipe E, fills the compartments A and B of the same, overflows at the diaghragm 2 and falls into the compartment C, passing thence to the compartment D from which it is discharged by an opening S and outer discharge pipe Y.

During the rapid flow of the water through the interior of the apparatus, occur the phenomena above referred to.

Although the apparatus has been shown as comprising four compartments, it will be evident that a larger or smaller number of the same may be provided, depending on the degree of impurity of the water to be treated therein; thus, certain waters much charged with impurities may require from six to eight compartments, while for other rather pure waters, two will be sufficient.

In the interior of the apparatus, the outside of which is formed by a cylindical casing D of suitable insulating material, two metallic sheets A and B are arranged in form of a spiral and perfectly equidistant; these plates or sheets constitute the electrodes.

To the core C, placed at the center of the apparatus, is secured one of the ends $a$ of the spiral sheet A, whose other end is secured to the inner surface $a'$ of the wall of the cylinder or drum D. To the same core, at a point $b$ of the same, is secured the second spiral sheet or plate B, the other end of which is similarly affixed at $b'$ on the inner surface of the wall of the cylinder D.

The inner surface of this wall D, as well as the core C, must be of such a particular shape as will allow of the constant parallelism of the two sheets A and B, that is to say, a perfect equidistance should be maintained between them, this condition being most important for assuring the proper reaction to take place at all points at the least possible consumption of electric energy.

Outside of the wall D, at the upper part of the purifier, is arranged a flange in the manner of a channel or groove H, provided with the discharge spout S. The liquid overflows into said channel by the openings I, shown in the drawings, or it passes directly to the same from the upper rim of the wall D.

Each of the spiral sheets A and B is connected to an electric pole.

This apparatus operates in the following manner: The water enters into its lower part, by a pipe E which preferably discharges into a particular chamber or compartment arranged below the vessel and which communicates at the bottom of the continuous compartment, formed by the two parallel sheets A and B. From said particular chamber, the water flows to the main container where it comes into contact with the electrodes; thereupon, the water overflows at the rim and passes to the channel H from which it is discharged by the spout S. The water, while performing this travel, is submitted to the reactions above set forth.

As in the apparatus first described, the length of the spiral electrodes and the distance which separates them, will be determined in proportion to the amount of impurities contained in the water.

This purifier consists of an outer square casing D, constructed of a suitable insulating material, at the center of which is arranged a core C which in a manner similar to the outer casing D and to the apparatus above described, has been properly shaped so as to allow of the metallic spiral sheets A and B being arranged parallel and equidistant through their entire length.

The sheets which constitute the electrodes, are secured at $a$ and $b$, respectively, to the core C, and at $a'$ and $b'$, respectively, to the inner surface of the outer wall D. The upper part of the casing D is provided with the opening I for the discharge of the liquid into a grooved rim or channel A which surrounds the said wall and is provided with a discharge outlet S, by which the purified water is discharged.

The circulation of the water in this embodiment of the purifier, takes place in the same manner as has been described in connection with the preceding form, so that any further description of the same is deemed unnecessary.

Although three particular forms of construction of the apparatus have been shown, it will be evident that the invention is not limited thereto, but that any other suitable arrangement, not departing from its essential features, may as well be used.

The term "cataphoresis" previously referred to and as applied in the claims has reference to a migration of positively charged particles suspended in a liquid from the cathode to the anode. The phenomenon "cataphoresis" can take place only in an intensely stressed electric field having a high dielectric gradient.

We now declare that what we claim and desire to secure by Letters Patent, is:—

1. Apparatus for purifying water, comprising means for defining a water passage and means for subjecting the water during its flow through said passage to the action of an intensely stressed electric field under conditions producing cataphoresis.

2. Apparatus for purifying water, comprising means for defining a water passage, and means for subjecting the water during its flow through said passage to the action of an intensely stressed unidirectional electric field under conditions producing cataphoresis.

3. Apparatus for purifying water, comprising a vessel and means therein for defining a water passage of relatively large effective cross-section, and means for subjecting the water during its flow through said passage to the action of an intensely stressed electrical field under conditions producing cataphoresis.

4. Apparatus for purifying water, comprising a vessel having an inlet and an outlet of relatively large effective cross-section, means in the vessel for defining intermediate the inlet and the outlet a water passage of relatively large effective cross-section, and means for subjecting the water during its flow through the said passage to the action of an intensely stressed electric field.

5. Apparatus for purifying water, comprising a vessel having an inlet and an outlet at opposite ends and two electrically separated metallic ribbons intercoiled in spaced relation and positioned to define a passage for the water intermediate the inlet and outlet and means for charging the ribbons with electricity of opposite sign under conditions producing cataphoresis.

6. Apparatus for purifying water, comprising a cylindrical vessel having openings at its ends and two electrically separated metallic ribbons spirally intercoiled in spaced relation to define a passage for the water intermediate the openings and means for charging the ribbons with electricity of opposite sign under conditions producing cataphoresis.

In testimony whereof we affix our signatures in the presence of two witnesses.

MIGUEL PUIGGARI.
NESTOR VENEZIA.

Witnesses:
C. C. FORMSOL,
E. B. COOPER.